INVENTORS: L.N. HOLZMAN
B.R. SALTZBERG
BY J.P. Kearns
ATTORNEY

Oct. 28, 1969 L. N. HOLZMAN ET AL 3,475,626

FOUR-QUADRANT PHASE SHIFTER

Filed Oct. 6, 1966 2 Sheets-Sheet 2

United States Patent Office 3,475,626

Patented Oct. 28, 1969

3,475,626

FOUR-QUADRANT PHASE SHIFTER

Louis N. Holzman, Lincroft, and Burton R. Saltzberg, Middletown, N.J., assignors to Bell Telephone Laboratories, Incorporated, Murray Hill and Berkeley Heights, N.J., a corporation of New York Filed Oct. 6, 1966, Ser. No. 584,883

Int. Cl. H03k 17/26, 17/28

U.S. Cl. 307—293 9 Claims

ABSTRACT OF THE DISCLOSURE

The output of a stable oscillator is shifted in phase full-circle electronically under the control of a direct-current signal while maintaining the output amplitude substantially constant. In an illustrative embodiment quadrature phases of the oscillator output are multiplied by sine and cosine functions of the control signal and the resultant product waves are added to form a proportionally phase-shifted wave of the original frequency.

This invention relates to variable phase shifting circuits permitting the output wave of a stable oscillator to be shifted full circle.

An object of the invention is to achieve an all-electronic variable phase shifter capable of linear control over a full 360-degree range.

A further object is to vary the phase of an alternating-current wave of constant frequency in direct proportion to a direct-current control signal while maintaining the output amplitude substantially constant.

In receivers for high-speed data transmission systems it is necessary to maintain a high degree of phase correspondence between the demodulating carrier wave and the transmitting carrier wave. It is also necessary in timing recovery circuits for data transmission systems to control the phase of sampling signals with respect to the opening of the receiver eye pattern. Control signals are developed in various ways known to the art relating the departure of the demodulating carrier phase from the transmitting carrier phase, such as by transmission of pilot tones or carrier wave components. Such control signals facilitate phase adjustment of local oscillators employed for demodulation of the received signal or for sampling purposes.

According to this invention, vectors in known phase relation are derived from a stable oscillation whose phase is to be varied. The known phase relation may advantageously be chosen as the quadrature or 90-degree relation. The amplitudes of the chosen vectors are adjusted relative to one another under the control of function generators and then added together to form a resultant vector whose phase varies over a range of 360 degrees. The outputs of the function generators are in turn derived from the control signal in such a way that the phase shift in the resultant vector is linearly or monotonically related to the magnitude of the control signal.

In a practical embodiment of this invention the function generator is a binary up-down counter so that the desired phase shift is digitally controlled. Any desired phase shift is thus readily reproducible.

It is a feature of this invention that its implementation is much less complex than previous mechanical servo systems or electronic systems using variable reactances.

For a better appreciation of the above and other objects, features and advantages of this invention reference is made to the following detailed disclosure and the drawing in which.

Figure 1:
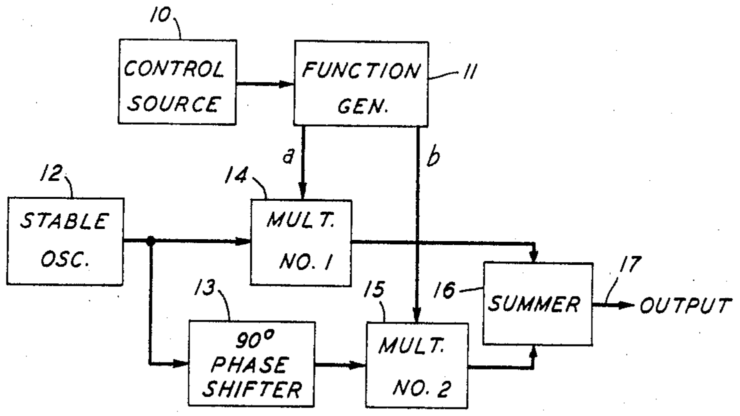
FIG. 1 is a block diagram of an illustrative embodiment of the phase shifter of this invention using quadrature components of the oscillatory wave whose phase is to be varied.

FIG. 1 of the drawing illustrates the basic phase-shifting circuit of this invention. It is assumed that the output of stable oscillator 12, which may advantageously be the local oscillator in a synchronous data transmission system, is to be adjustable in phase throughout a range of 360 degrees without disturbing any of the frequency-determining elements thereof. The phase shift effected is further to be a linear function of a direct current control voltage from control source 10.

Let the output of oscillator 12 be $$V_{in}=A\cos\omega t \quad (1)$$

where

A=amplitude
$\omega=2\pi\times$frequency.

The quadrature component of $V_{in}$ is obtained in fixed 90-degree phase shifter 13 as $$V_{in(90)}=A\cos\left(\omega t-\frac{\pi}{2}\right)=A\sin\omega t \quad (2)$$

According to our invention, two factors $a$ and $b$ can be found such that multiplication of the two quadrature components of Equations 1 and 2 by these factors will result in two new waves whose sum $V_{out}$ has the same frequency as $V_{in}$, but whose phase shift is a linear function of a control signal.

Thus, simply stated $$V_{out}=A(a\cos\omega t+b\sin\omega t) \quad (3)$$

Let factor $a$ be $$a=K_1\cos K_2V \quad (4)$$

and factor $b$ be $$b=K_1\sin K_2V \quad (5)$$

In Equations 4 and 5 $K_1$ and $K_2$ are arbitrary constants and V is the voltage or current output of control source 10.

Function generator 11 produces factors $a$ and $b$ in any conventional manner such as by means of sine and cosine potentiometers driven by a servomotor, whose rotation angle is determined by the output V of control source 10.

The output of multiplier 14 is $$V_1=aV_{in}=AK_1\cos K_2V\cos\omega t \quad (6)$$

Similarly, the output of multiplier 15 is $$V_2=bV_{in(90)}=AK_1\sin K_2V\sin\omega t \quad (7)$$

By well-known trigonometric identities Equations 6 and 7 can be rewritten as $$V_1=\frac{AK_1}{2}[\cos(\omega t-K_2V)+\cos(\omega t+K_2V)] \quad (8)$$

and $$V_2=\frac{AK_1}{2}[\cos(\omega t-K_2V)-\cos(\omega t+K_2V)] \quad (9)$$

The desired output from linear summer 16 on line 17 becomes $$V_{out}=V_1+V_2=AK_1\cos(\omega t-K_2V) \quad (10)$$

It is apparent from Equation 10 that $V_{out}$ is of the same frequency as $V_{in}$, but shifted in phase by the amount $K_2V$. The new phase is thus directly proportional to the output of control source 10 and the output amplitude $AK_1$ is constant. If $K_1$ is further taken as unity, the output amplitude is the same as that of the input. The phase shift of the output is also expressible as arc tan $b/a$.

Figure 2:
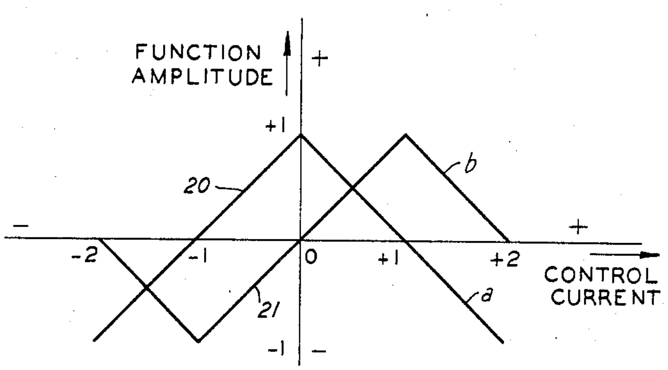
FIG. 2 is a wave diagram of a representative function generator output useful in the practice of this invention.

For many purposes, such as for the generation of timing pulses by hard limiting and differentiating the output, the amplitude of the output wave is not of critical importance. Only the transitions are significant. Then it is sufficient to approximate the sine and cosine functions from function generator 11 piecewise linearly as shown in the waveform of FIG. 2. Here the abscissa represents control voltage or current extending over a range of plus and minus two. The ordinate represents the function amplitude—a range of plus and minus one. Waveform 20 follows the peaks and zero crossings of the cosine function $a$, while waveform 21 similarly follows the peaks and zero crossings of the sine function $b$. These functions may conveniently be generated by using servo-driven linear potentiometers. The output amplitude will no longer be constant, but will vary over a range of $1:\sqrt{2}$. Similarly, the derivative of the phase will vary over the same range, but the phase itself will still vary monotonically, though not precisely linearly, with the control wave.

The following Table I illustrates representative results of applying the piecewise linear function of FIG. 2 to the phase shifter of FIG. 1.

TABLE I

| | a | b | Function | Phase Shift, ° |
|---|---|---|---|---|
| Control Voltage: | | | | |
| −2 | −1 | 0 | −cos | −180 |
| −1 | 0 | −1 | −sin | −90 |
| $-\frac{1}{2}$ | $+\frac{1}{2}$ | $-\frac{1}{2}$ | $-\frac{1}{2}$sin$+\frac{1}{2}$cos | −45 |
| 0 | 1 | 0 | +cos | 0 |
| $+\frac{1}{2}$ | $\frac{1}{2}$ | $\frac{1}{2}$ | $\frac{1}{2}$sin$+\frac{1}{2}$cos | +45 |
| +1 | 0 | 1 | +sin | +90 |
| +2 | −1 | 0 | −cos | +180 |

Other fractional values of the control voltage result in phase shifts at other angles in an obvious manner.

Figure 3:
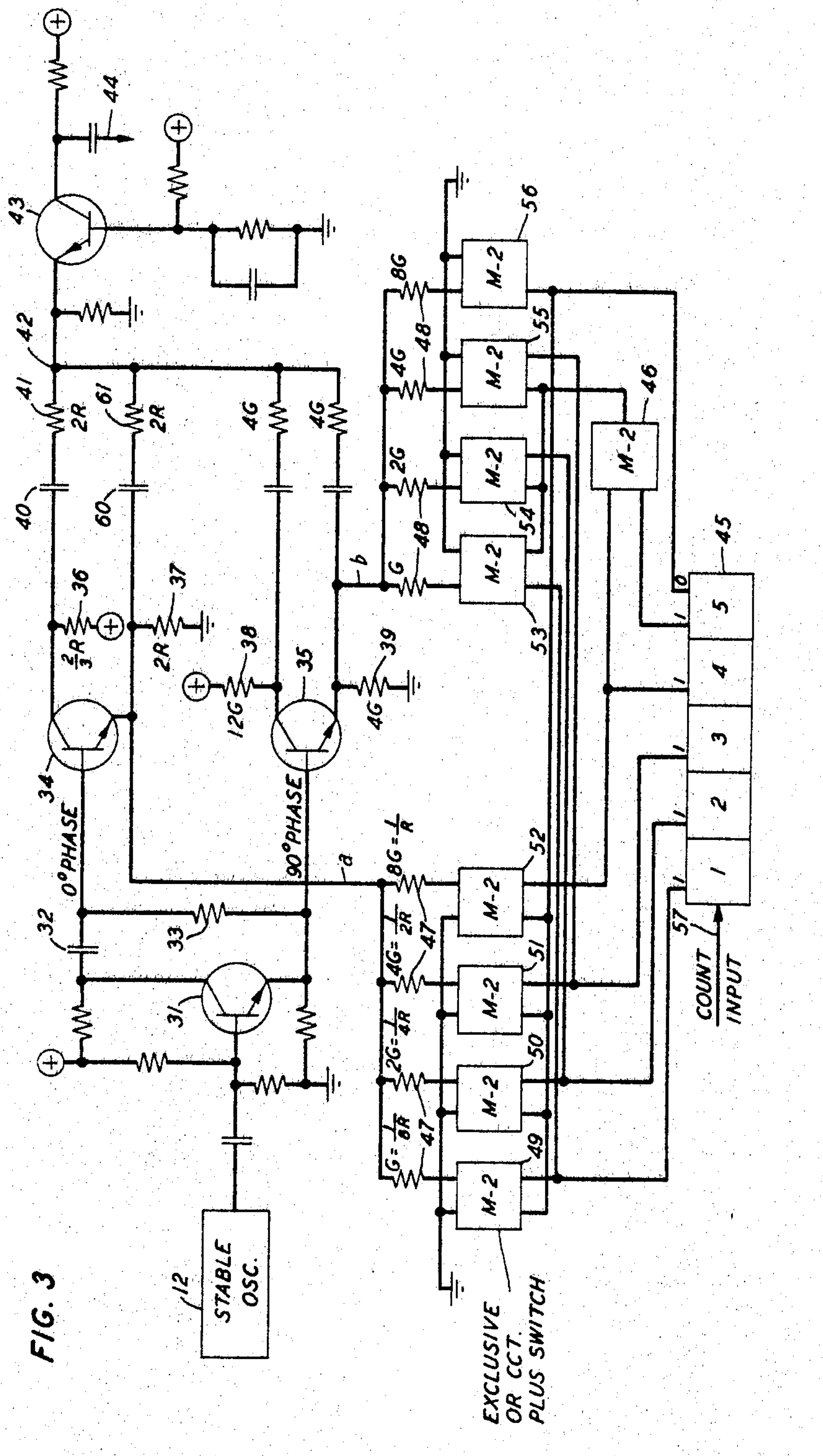
FIG. 3 is a block schematic diagram of a digital counter controlled phase shift circuit according to this invention.

A practical digital implementation of the phase shifter of this invention is illustrated in FIG. 3. The control signal is here developed from a multistage binary up-down counter and the output phase with respect to the input will be proportional to the count standing in the counter. This phase shifter will have specific utility in the timing recovery circuit of B. R. Saltzberg Ser. No. 584,893 filed concurrently herewith.

On FIG. 3 the single-frequency output of oscillator 12 is phase split into in-phase and quadrature-phase components in the circuit associated with transistor 31. This transistor is biased for linear amplification by the resistive voltage dividers as shown. Across its output, capacitor 32 and resistor 33 together cause a 90-degree phase shift of the output at their junction relative to the emitter output. For purposes of explanation the output across the emitter load resistor is considered the quadrature-phase output. The resultant respective cosine and sine components are amplified in transistors 34 and 35. Outputs across the collector resistor 36 and emitter resistor 37 associated with transistor 34 are combined at point 42 by way of series capacitors and resistors such as capacitors 40 and 60 and resistors 41 and 61. The values of resistors 36 and 37 are so chosen that, in the absence of a connection of line $a$ to the emitter of transistor 34, the sum at point 42 will be maximum. Capacitors 40 and 60 are sufficiently large to have negligible impedance at the frequency of oscillator 12.

This result can be explained readily if the illustrative resistive values marked on the drawing are assumed. These values in ohms are: for collector resistors 36 and 38, ⅔R; for emitter resistors 37 and 39 and summing resistors 41 and 61, 2R. R may advantageously be 500 ohms. The effective resistance in the collector circuit is the parallel combination of resistors 36 and 41 or $R/2$ ohms. Similarly the effective resistance in the emitter circuit is the parallel combination of resistors 37 and 61 or R ohms. Therefore, the ratio of currents through resistors 41 and 61 is 2:1. Since transistor 34 effects a phase reversal between collector and emitter, and the same current flows through collector and emitter, the sum of the currents at point 42 may be considered to be one unit. Thus, the amplitude of the output is the same as that of the input.

Similarly, the outputs across collector resistor 38 and emitter resistor 39 associated with transistor 35 are also combined through similar summing resistors at point 42. The total current at point 42 is further combined in low-impedance buffer transistor 43 and the output is available on line 44, which is capacitively coupled to the collector of transistor 43.

On the assumption that lines $a$ and $b$ are disconnected, the circuit of FIG. 3 is equivalent to that of FIG. 1 with factors $a$ and $b$ equal. To vary factors $a$ and $b$ resistor banks 47 and 48 are provided at leads $a$ and $b$, respectively. The values of resistors 47 and 48 are established in a geometric progression with a ratio of two. Thus, they are weighted in binary fashion with the lowest value on the right matching half the value of emitter resistors 37 and 39 for transistors 34 and 35, or $R=500$ ohms.

For ease of explanation, and since parallel resistors are involved, the several resistors may be more conveniently expressed in terms of conductance as is indicated on FIG. 3 for the resistors associated with transistor 35. These are equivalent in value to the similar resistors associated with transistor 34. If G is chosen as 0.000250 mhos, then R equals 1/.8G. Thus, the net conductance of the collector circuit is fixed at 16G mhos, and that of the emitter circuit with no conductance added on line $a$ or $b$ is 8G mhos. The conductance of the emitter circuit is augmented by adding one or more of the resistors 47 or 48. When the rightmost resistor (8G mhos) of banks 47 or 48 is added, the total conductance of the emitter circuit becomes 16G mhos, exactly equal to that of the collector circuit. Therefore, the summation of currents at point 42 from one of transistors 34 or 35 is zero. The output phase effective on line 44 is then either the in-phase or quadrature-phase component of the output of oscillator 12, depending on whether the output from transistor 35 or 34 cancels.

If less than 8G mhos are added to the emitter circuit of either transistor 34 or 35, the ratio of collector circuit current to emitter circuit current will be less than one. For example, the addition of 4G mhos to the emitter circuit yields a net emitter conductance of 12G mhos, and the collector-emitter ratio is 3/4. This ratio is equivalent to 1.5 units of current at the collector to two units at the emitter. The effective in-phase amplitude of the output is thus half that obtained with no added conductance.

If more than 8G mhos are added to the emitter circuit of either transistor 34 or 35, the ratio of collector circuit current to emitter circuit current becomes greater than one. For example, the addition of 12G mhos to the emitter circuit yields a net emitter conductance of 20G mhos, and the collector-emitter ratio is 5/4. This ratio is equivalent to 2.5 units of current at the collector to two units at the emitter. The effective reversed-phase amplitude of the output is thus half that obtained with no added conductance.

The summation of all four currents at point 42 from both transistors 34 and 35 determines the phase shift of the net output according to Equation 3.

Gates 49 through 56 may be readily constructed of an exclusive-OR circuit, having a significant output only when its two inputs are of opposite polarities, and a transistor switch which, when operated, closes the output leads connected to a resistor 47 or 48 to the ground bus shown. The exclusive-OR function is sometimes described as a modulo-two adder, hence the designation in the blocks of M–2. A modulo-two adder produces an output of one type when the sum of its inputs is odd and an output of another type when the sum of its inputs is even.

The several M–2 gates are connected to the counter outputs as follows:

The "1" output of counter stage 1, to gates 49 and 53; the "1" output of counter stage 2 to gates 50 and 54; the "1" output of counter stage 3 to gates 51 and 55; the "1" output of counter stage 4 to gates 46 and 52; the "1" output of counter stage 5 to gate 46; and the "0" output of counter stage 5 to gates 49 through 52 and 56. Auxiliary gate 46 serves effectively to reverse the count on the *b* lead when the states of counter stages 4 and 5 are in opposition.

A plurality of gate circuits 49 through 52 for resistors 47 and 53 through 56 for resistors 48 are provided. By means of these gates one or more of the resistors 47 and 48 may be grounded and thus placed in parallel with emitter resistors 37 and 39 to control the relative currents from transistors 34 and 35.

Gates 49 through 56 are in turn selectively opened (providing a conductive path to ground) under the control of a reversible binary counter 45, shown in FIG. 3 as comprising five stages capable of counting up to 32. A count input is provided on lead 57, the control input. A digital count may be obtained from an analog control signal by the use of an analog-to-digital converter by any conventional means.

In a practical embodiment resistors 47 and 48 were chosen to be 8R, 4R, 2R and R, respectively, with R being 500 ohms, as previously mentioned. Emitter resistors 37 and 39 are fixed at 2R accordingly. For convenience in handling parallel resistors the values of resistors are also indicated as G, 2G, 4G and 8G mhos of conductance, where G equals 0.000250.

The operation of the counter and gate circuits is straightforward. A few examples are given by way of explanation. At the count of zero all counter stages are storing zeros. There is a significant output on the "0" output of the fifth stage only of counter 45. Since this output primes gates 49 through 52 and 56, all resistors 47 are in circuit with line *a* and the rightmost resistor 48, with line *b*. According to the previous explanation, the output from transistor 35 is canceled and the output from transistor 34 is very nearly reversed in phase. It is not completely reversed in phase because the maximum conductance is only 15 times the incremental conductance instead of 16 times. The phase shift is then about −180 degrees.

At the count of 00111 (decimal count 7) gates 49 through 52 are primed by the "0" output of stage 5 but gates 49 through 51 are inhibited by the "1" counts in the first three stages of the shift register. However, gates 53 and 54 are primed by these same counts and auxiliary gate 46 has a "0" output. Gate 56 remains open. Therefore, the 8G resistor 47 is on line *a* and all resistors 48 are in circuit with line *b*. As a result the output of transistor 34 is canceled and the output of transistor 35 is nearly reversed in phase with respect to its quadrature phase input. Thus, the phase shift is about 270 or −90 degrees.

At the count of 10111 (decimal count 15) gates 49 through 52 are no longer primed by the output of stage 5, but the "1" counts in the first three stages open gates 49 through 51. The conductance on line *a* is 7G. Auxiliary gate 46 is now open and gates 53 through 55 are primed thereby. However, the counts in the first three stages inhibit these gates. All gates 53 through 56 are therefore closed and there is no conductance added on line *b*. The output of transistor 34 is about ⅛ the amplitude of its input and the output of transistor 35 is equal and in-phase with its quadrature input. The resultant phase shift is slightly more than 90 degrees.

The circuit of FIG. 3 may be analyzed in a similar fashion for the other counts in counter 45.

The following Table II summarizes the correspondence of counter setting in binary form with the amount of conductance added in parallel with emitter resistors 37 and 39 and the phase shift achieved.

TABLE II

| | Left Gates | | | | Right Gates | | | | Aux. Gate | L. Cond. | R. Cond. | Phase |
|---|---|---|---|---|---|---|---|---|---|---|---|---|
| Count | 49 | 50 | 51 | 52 | 53 | 54 | 55 | 56 | 46 | a | b | Angle |
| 00000 | x | x | x | x | | | | x | | 15G | 8G | −175 |
| 00001 | | x | x | x | x | | | x | | 14G | 9G | −162 |
| 00010 | x | | x | x | | x | | x | | 13G | 10G | −150 |
| 00011 | | | x | x | x | x | | x | | 12G | 11G | −138 |
| 00100 | x | x | | x | | | x | x | | 11G | 12G | −126 |
| 00101 | | x | | x | x | | x | x | | 10G | 13G | −114 |
| 00110 | x | | | x | | x | x | x | | 9G | 14G | −102 |
| 00111 | | | | x | x | x | x | x | | 8G | 15G | −90 |
| 01000 | x | x | x | | x | x | x | x | x | 7G | 15G | −77 |
| 01001 | | x | x | | | x | x | x | x | 6G | 14G | −64 |
| 01010 | x | | x | | x | | x | x | x | 5G | 13G | −52 |
| 01011 | | | x | | | | x | x | x | 4G | 12G | −40 |
| 01100 | x | x | | | x | x | | x | x | 3G | 11G | −28 |
| 01101 | | x | | | | x | | x | x | 2G | 10G | −15 |
| 01110 | x | | | | x | | | x | x | G | 9G | −2 |
| 01111 | | | | | | | | x | x | O | 8G | +10 |
| 10000 | | | | | x | x | x | | x | O | 7G | +20 |
| 10001 | x | | | | | x | x | | x | G | 6G | +30 |
| 10010 | | x | | | x | | x | | x | 2G | 5G | +40 |
| 10011 | x | x | | | | | x | | x | 3G | 4G | +50 |
| 10100 | | | x | | x | x | | | x | 4G | 3G | +60 |
| 10101 | x | | x | | | x | | | x | 5G | 2G | +72 |
| 10110 | | x | x | | x | | | | x | 6G | G | +82 |
| 10111 | x | x | x | | | | | | x | 7G | O | +92 |
| 11000 | | | | x | | | | | | 8G | O | +102 |
| 11001 | x | | | x | x | | | | | 9G | G | +112 |
| 11010 | | x | | x | | x | | | | 10G | 2G | +122 |
| 11011 | x | x | | x | x | x | | | | 11G | 3G | +133 |
| 11100 | | | x | x | | | x | | | 12G | 4G | +143 |
| 11101 | x | | x | x | x | | x | | | 13G | 5G | +154 |
| 11110 | | x | x | x | | x | x | | | 14G | 6G | +164 |
| 11111 | x | x | x | x | x | x | x | | | 15G | 7G | +175 |

The overall operation of the circuit of FIG. 3 is readily apparent from Table II and the previous examples. An *x* in any of the gate columns indicates the opening of that gate for the particular counter setting. Counter 45 may readily be provided with forward and reverse counting inputs as is well known in the art. The amount of conductance change between counter steps is seen to be an increment of G mhos. The conductance on lead *a* varies with increasing count from maximum to minimum to maximum following curve 20 of FIG. 2. At the same time the conductance on line *b* increases from a median value to a maximum then decreases to a minimum value and finally returns to the median value. This is in accordance with curve 21 of FIG. 2. The resultant incremental phase change is then reasonably constant, varying between 10 and 13 degrees over a range of plus and minus 175 degrees. The amplitude will be found to be reasonably constant within about 3 decibels.

The incremental phase change per count can readily be reduced by providing a counter with additional stages.

Within the principles of the invention a broadband signal can be shifted over a 360-degree range, provided only that the fixed 90-degree phase shifter is broadband.

As a further application of the principles of this invention, the single frequency input can be divided down to some subharmonic frequency. The subharmonic frequency is then phase split by some chosen angle into two related phasors. By control of the level of one of these phasors according to the output of a function generator over a range of at least twice the level of the other phasor, the phase of the sum of the phasors will vary over the range of 360 degrees divided by the division factor. If this resultant is now frequency-multiplied by the division factor, the original input will have been effectively varied over a range of 360 degrees. For example, if the division factor is four and the phasor angles are plus and minus 60 degrees, the combined phasor will vary by 90 degrees. The latter angle multiplied by four will then vary the resultant over 360 degrees. It is even possible by this implementation to attain a range of phase shifts exceeding 360 degrees by varying the one phasor level by more than twice the level of the other or by increasing the angle between the phasors.

What is claimed is:

1. A phase-shift adjuster having a 360-degree range comprising in combination means producing an oscillatory wave which is stable in frequency and phase, means splitting said oscillatory wave producing two output components of fixed phase difference, means establishing a direct-current control magnitude proportional to the amount of phase shift desired to be imparted to said oscillatory wave, function generator means responsive to said control magnitude generating at least one output having positive and negative peaks separated by zero crossing points at integral multiples of the control magnitude, means multiplying at least one of the components from said splitting means by an output of said generating means to form a product wave, and means adding said product wave to the other component from said splitting means to form a resultant wave whose frequency is that of said oscillatory wave and whose phase is shifted from that of said oscillatory wave by said desired amount.

2. The phase-shift adjuster of claim 1 in which said splitting means produces quadrature components of said oscillatory wave, said generating means produces two outputs whose respective peaks and zero crossings are interlaced, said multiplying means factors said quadrature components with the respective outputs of said generating means to form product waves of controlled amplitude, and said adding means combines said product waves to form a single controllably phase-shifted resultant wave.

3. The phase-shift adjuster of claim 1 in which said splitting means is a 90-degree phase shifter producing a direct output and another output at 90 degrees from the direct output, said generating means produces two outputs related to each other as the sine and cosine of said control magnitude, said multiplying means products said direct output and said 90-degree output with the respective cosine and sine related outputs of said generating means, and said adding means forms from the products of said multiplying means a resultant wave whose phase with respect to that of said oscillatory wave is linearly related to said control magnitude.

4. The phase-shift adjuster of claim 1 in which said oscillatory wave producing means is a stable single-frequency oscillator.

5. The phase-shift adjuster of claim 1 in which said oscillatory wave producing means emits a broad continuous band of frequencies.

6. The phase-shift adjuster of claim 1 in which a frequency dividing means of a predetermined ratio is placed in tandem with said oscillatory wave producing means and a frequency multiplying means of the same predetermined ratio follows said adding means.

7. The phase-shift adjuster of claim 1 in which said establishing means is a multistage binary counter having a plurality of outputs and having a count level going from a maximum to a minimum, and said generating means comprises a plurality of binary weighted resistors each having two terminals, a ground reference, means connecting one terminal of each of said resistors in common, and means under the control of the outputs of the several stages of said counter selectively connecting the remaining terminals of said resistors to said ground reference such that the net resistance in parallel is incrementally and cyclically changed in accordance with said count level from maximum to minimum.

8. The phase-shift adjuster of claim 7 in which said generating means comprises two like pluralities of binarily weighted resistors, grounding means, and means for selectively connecting the resistors in each said plurality to said grounding means under the control of said counter such that when one plurality of resistors is at the median resistance value the other is at its maximum or minimum value in the respective cycles.

9. In combination, a stable oscillator producing an output of fixed frequency, means splitting the output of said oscillator thereby producing quadrature related phase components, separate means amplifying each of said phase components, said amplifying means being common-emitter-connected transistors each having a base, a collector, and an emitter electrode, a common output point, means combining currents derived from the collector and emitter electrodes of said amplifying means at said common output point, first and second pluralities of binarily weighted two terminal resistors, means connecting one terminal of asid resistors to the respective emitter electrodes of said amplifying means, first and second pluralities of gating means, means connecting the other terminals of said respective first and second pluralities of resistors to said first and second pluralities of gating means such that the operation of any said gating means connects its associated resistor to the emitter electrode of one of said amplifying means, and multistage binary counter means selectively controlling said first and second pluralities of gating means to change the net resistance connected to the emitter electrodes of said amplifying means in incremental amounts count by count, the total resistance connected to the emitter electrode of one amplifying means increasing from minimum to maximum and return over the full count and that connected to the emitter electrode of the other amplifying means cycling from median to minimum to maximum to median values over the full count.

References Cited

UNITED STATES PATENTS

| | | | |
|---|---|---|---|
| 3,250,903 | 5/1966 | Vasu et al. | 235—186 |
| 3,250,904 | 5/1966 | Vasu et al. | 235—186 |
| 3,287,627 | 11/1966 | Poehlman | 307—295 XR |
| 3,296,458 | 1/1967 | Fracassi et al. | 307—293 XR |
| 3,296,556 | 1/1967 | Schaefer | 332—16 XR |
| 3,393,326 | 7/1968 | Candy | 307—262 XR |

JOHN S. HEYMAN, Primary Examiner

STANLEY T. KRAWCZEWICZ, Assistant Examiner

U.S. Cl. X.R.

235—186; 307—262; 324—83; 328—55, 155; 332—16